No. 738,056.

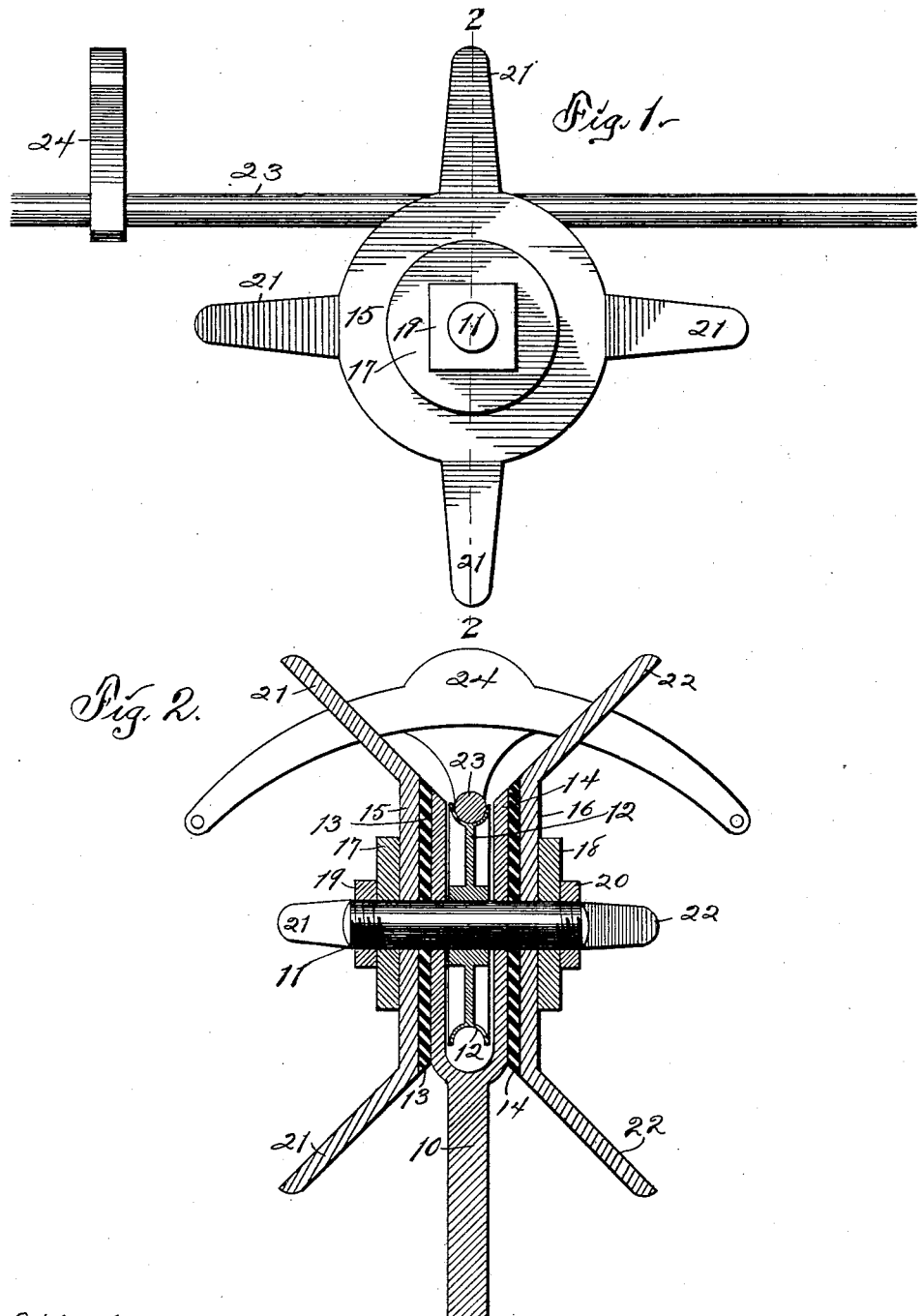

Patented September 1, 1903.

UNITED STATES PATENT OFFICE.

MOSES NICHOLLS AND CLARK J. SMITH, OF OTTUMWA, IOWA; SAID NICHOLLS ASSIGNOR TO MARTIN HARDSOCG, OF OTTUMWA, IOWA.

TROLLEY.

SPECIFICATION forming part of Letters Patent No. 738,056, dated September 1, 1903.

Application filed December 15, 1902. Serial No. 135,351. (No model.)

*To all whom it may concern:*

Be it known that we, MOSES NICHOLLS and CLARK J. SMITH, both citizens of the United States of America, and residents of Ottumwa, in the county of Wapello and State of Iowa, have invented certain Improvements in Trolleys, of which the following is a specification.

The object of this invention is to provide improved means for guiding and retaining a trolley-wheel on an overhead or trolley wire in electric-railway systems.

Our invention consists in the construction, arrangement, and combination of elements hereinafter set forth, pointed out in our claims, and illustrated by the accompanying drawings, in which—

Figure 1 is an elevation illustrating the construction of our improved device. Fig. 2 is a vertical section of our device on the indicated line 2 2 of Fig. 1.

In the construction of the device, as shown, the numeral 10 designates a trolley-pole formed with a fork on its outer end. The trolley-pole 10 may be of any desired form and construction and may be mounted in any desired way on the car which carries it. A bolt 11, preferably screw-threaded at both ends, is mounted transversely of the fork of the trolley-pole 10, and a trolley-wheel 12 is mounted for rotation on said bolt within the fork of the trolley-pole. The trolley-wheel 12 may be of any desired form and construction, and its bearing on the axle-bolt 11 may be of any desired form and construction. Friction-plates 13 14, preferably made of vulcanite fiber, as best suited to the production of the desired friction, are mounted on the axle-bolt 11 in contact with the outer faces of the arms and of the fork of the trolley-pole 10. The guide wheels or disks 15 16 are mounted for revolution on the axle-bolt 11 in contact with the outer faces of the friction-plates 13 14, and washers 17 18 are mounted on said axle-bolt in contact with the outer faces of the guide wheels or disks and are confined by nuts 19 20, screwed on the end portions of said axle-bolt. The nuts 19 and 20 are screwed or seated on the axle-bolt sufficiently tight to bind the guide wheels or disks firmly to the friction-plates 13 14 and bind said friction-plates firmly to the arms of the trolley-pole.

The function of the friction-plates operating conjunctively with the washers 17 18 and nuts 19 20 is to limit, retard, and brake the movement of revolution of the guide wheels or disks 15 16 on the axle-bolt. Each of the guide-wheels 15 16 is formed with radial arms 21 22, preferably four arms for each wheel. In addition to being arranged radially of the wheels or disks the guide-arms are projected outwardly at angles approximating to forty-five degrees relative to the faces of said wheels or disks, the arms on one wheel diverging from the arms of the other wheel.

It will be observed that the outer end portions of the arms of the trolley-pole 10 are beveled inwardly, that the friction-plates 13 14 are beveled inwardly, and that the guide wheels or disks are of such diameter that the inclined inner faces of the guide-arms 21 22 aline with the beveled faces of the friction-plates and pole-arms. Thus is provision made for the centering of the trolley on a conductor or trolley-wire 23 readily and conveniently, for the reason that when one or another of the guide-arms engages beneath said trolley-wire the entire device on the fork of the trolley-pole will move laterally and furnish a smooth and uninterrupted incline for the trolley-wire to find a seat on the trolley-wheel 12.

The trolley-wire 23 ordinarily is suspended by means of a series of trolley-stays 24, soldered or otherwise fixed thereto, and said stays are supported by guy-wires leading laterally therefrom. In the travel of the trolley device along the conductor, with the trolley-wheel 12 in contact with said conductor, arms 21 22 on the guide-wheels engage successive trolley-stays 24 and rotates slightly to pass under said trolley-stays.

It is desirable to employ four or more guide-arms on each of the guide-wheels in order that one or another pair of said arms will at all times embrace the conductor and be in position to serve as finders for the conductor in the event that the trolley device is accidentally detached or disconnected from the conductor. In this connection also is to be found the advantage of introducing friction-plates between the guide wheels or disks and the adjacent arms of the trolley-pole 10 to limit and brake the rotary movement of the guide-wheels.

We claim as our invention—

1. The combination of the trolley-pole formed with a fork, the axle-bolt mounted transversely of the fork of the trolley-pole, the trolley-wheel mounted for revolution on said axle-bolt, the guide-wheels mounted for revolution on the axle-bolt outside the fork of the trolley-pole and arms on said guide-wheels arranged radially of the perimeter thereof and extending outwardly obliquely therefrom.

2. In a device of the class described, the combination of the trolley-pole formed with a fork, the axle-bolt mounted transversely in the fork of the trolley-pole, the trolley-wheel mounted for revolution on the axle-bolt and within the fork of the trolley-pole, friction-plates mounted on the axle-bolt in contact with the outer faces of the fork of the trolley-pole, guide-wheels mounted for revolution on the axle-bolt in contact with the outer faces of the friction-plates, arms positioned obliquely and radially on said guide-wheels, washers on the axle-bolt in contact with the outer faces of the guide-wheels and nuts on the axle-bolt in contact with the outer faces of the washers.

3. In a device of the class described, the combination of the trolley-pole formed with a fork, the axle-bolt mounted transversely in the fork of the trolley-pole, the trolley-wheel mounted for revolution on the axle-bolt and within the fork of the trolley-pole, friction-plates mounted on the axle-bolt in contact with the outer faces of the fork of the trolley-pole, guide-wheels mounted for revolution on the axle-bolt in contact with the outer faces of the friction-plates, arms positioned obliquely and radially on said guide-wheels, washers on the axle-bolt in contact with the outer faces of the guide-wheels and nuts on the axle-bolt in contact with the outer faces of the washers, the extremities of the arms of the trolley-pole being beveled in alinement with beveled edges of the friction-plates and the inclined inner faces of said arms on the guide-wheels.

Signed at Ottumwa, Iowa, this 20th day of September, 1902.

MOSES NICHOLLS.
CLARK J. SMITH.

In presence of—
W. A. WORK,
LULA M. RYDER.